Patented Mar. 4, 1930

1,749,482

UNITED STATES PATENT OFFICE

ALAN C. JOHNSTON, OF KENVIL, NEW JERSEY, ASSIGNOR TO HERCULES POWDER COMPANY, OF WILMINGTON, DELAWARE, A CORPORATION OF DELAWARE

METHOD OF PRODUCING ALKYL ESTERS OF ABIETIC ACID

No Drawing. Application filed October 18, 1927. Serial No. 227,042.

My invention relates to the production of alkyl esters of resin acids, and more particularly contemplates the production of alkyl esters of abietic acid, through the use of alkyl halides.

In carrying out the process embodying my invention the alkyl esters may be produced by the esterification of resin acids in a pure state or as found in resins and by virtue of my invention the esters may be prepared, for example, from ordinary wood rosin or from a resin, for example, containing pimaric acid.

According to my invention, for example, abietic acid or rosin is subjected to treatment with an alkyl halide, for example, an alkyl chloride such as ethyl chloride, amyl chloride, etc., or an akyl bromide, as ethyl bromide, butyl bromide, etc., in the presence of an alkali, such as sodium hydroxide, potassium hydroxide, calcium hydroxide, etc., the alkali preferably being in solution in alcohol. The treatment of the abietic acid, or of rosin, in accordance with my invention is carried out at temperatures enabling refluxing and may be carried out under atmospheric or increased pressure depending upon the alkyl halide used.

The process according to my invention more particularly involves the heating of abietic acid, or other resin acid, pure or as found in rosins or in resins, with an alkyl halide and sufficient alkali for neutralizing the abietic acid with the formation of a halide of the alkali and the alkyl abietate. The reaction is preferably carried out in the presence of a solvent, as an alcohol, which will dissolve both the alkyl halide and the inorganic abietate. When the reaction between the inorganic abietate, e. g. sodium resinate, and the akyl halide is complete, the inorganic halide formed is filtered off, the alcohol removed by distillation and the ester subsequently distilled off under reduced pressure. Any excess of the alkyl halide is recovered with the alcohol, both of which may be reused.

As examples of the carrying out of the process embodying my invention the following will be illustrative:—

In the production, for example, of ethyl abietate 40 parts of sodium hydroxide are dissolved in 325 parts of ethyl alcohol and 325 parts of rosin A. N. 170 are then dissolved in the solution. The solution is then heated with 75 parts of ethyl chloride for about one-half hour in an autoclave under a pressure of about 160 pounds and at a temperature of about 150° C.–160° C. The reaction is as follows:—

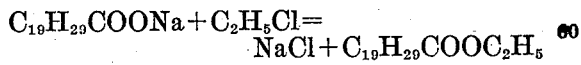

$$C_{19}H_{29}COONa + C_2H_5Cl = NaCl + C_{19}H_{29}COOC_2H_5$$

When the reaction, which will require about one-half hour, is complete the sodium chloride which has been formed is filtered out the alcohol distilled off and the ester, ethyl abietate, distilled under reduced pressure. Any excess of alkyl chloride and the alcohol are recovered and may be reused.

As a result of the carrying out of the process as given in the above example a yield of about 270 parts of ethyl abietate having an A. N. of 5 is obtained. If it is desired to obtain a product having a lower A. N., such can be obtained either by redistillation of the ester from a small amount of soda ash or by adding soda ash to the crude product from which the ester is originally distilled, prior to the distillation off of the ester.

As a further example of the carrying out of the process involving my invention, for example, for the production of n-butyl abietate, 20 g. of sodium hydroxide are dissolved in 20 cc. of water and 200 parts of ethyl alcohol added. To the solution formed 150 g. of rosin and 100 g. of butyl bromide are added and the whole refluxed for a period of six hours. When the reaction is complete the alcohol may be distilled off and then about 95 g. of n-butyl abietate, A. N. 6, may be recovered by distillation under reduced pressure.

As a further example, the n-amyl abietate may be prepared by forming a solution of 60 g. of sodium hydroxide and 750 parts of alcohol, then adding to the solution 450 parts of rosin and 200 parts of normal amyl chloride. The solution formed after being heated in an autoclave at say about 150° C.–160° C. for about one hour and distillation off of the alcohol will yield by distillation under reduced pressure about 353 parts of n-amyl abietate A. N. 5. The n-amyl abietate will distill within the range of about 240° C.–250° C. under 5 mm. pressure. Mixed amyl chlorides, or a mixture of alkyl chlorides, e. g. butyl, amyl and hexyl chlorides may be converted into alkyl abietates in a similar manner.

It will be noted that in the carrying out of the process embodying my invention the abietic acid, or resin acid, is substantially neutralized by treatment with an alkali, forming an inorganic salt of the abietic acid, or other resin acid. As the alkali I prefer to use sodium hydroxide, but it will be understood that potassium hydroxide, sodium carbonate, calcium hydroxide, etc. may be used.

It will be noted in accordance with my invention that the production of abietates or esters of abietic acid, which may be relatively pure, or as found in rosin, may be prepared through the use of alkyl halides such as the alkyl chloride or the alkyl bromide. In addition to the methyl and ethyl esters of abietic acid the n-propyl, isopropyl, n-butyl, isobutyl and isoamyl esters may be produced. Further, in accordance with my invention I have discovered the practicability of producing normal amyl abietate through the use of an alkyl halide, a compound which has not heretofore been known.

It will be understood that while I have described the application of my invention more particularly to the production of abietates, that my invention is applicable to and contemplates the treatment of other resin acids as, for example, pimaric acid.

I have not herein claimed the amyl ester of a resin acid and the method of producing the same as such forms the subject matter of an application for patent filed by me as a division hereof, filed June 12, 1928, Serial No. 234,877.

Having now fully described my invention, what I claim and desire to protect by Letters Patent is:—

1. The method of producing an alkyl ester of a resin acid, which includes the step of treating a resin acid with an alkyl halide in the presence of an alkali and distilling off the ester formed under reduced pressure.

2. The method of producing an alkyl ester of abietic acid, which includes the step of treating abietic acid with an alkyl halide in the presence of an alkali and distilling off the ester formed under reduced pressure.

3. The method of producing an alkyl ester of abietic acid, which includes heating a solution of abietic acid, an alkali and an alkyl halide and distilling off the ester formed under reduced pressure.

4. The method of producing an alkyl ester of abietic acid, which includes subjecting abietic acid to treatment with an alkyl halide in the presence of alcohol and an alkali and distilling off the ester formed under reduced pressure.

5. The method of producing an alkyl ester of abietic acid, which includes subjecting sodium abietate to treatment with an alkyl halide and distilling off the ester formed.

6. The method of producing an alkyl ester of a resin acid, which includes subjecting a resin to treatment with an alkyl halide and alkali in the presence of a solvent for both the alkyl halide and the inorganic salt of the resin acid, separating the alkali halide formed from the solution of the ester formed and distilling off the ester.

7. The method of producing an alkyl ester of abietic acid, which includes subjecting sodium abietate to treatment with an alkyl halide in the presence of a solvent for both the alkyl halide and sodium abietate, separating the alkali halide formed from the solution of the ester formed and distilling off the ester under reduced pressure.

8. The method of producing an alkyl ester of abietic acid, which includes heating an inorganic salt of abietic acid with an alkyl chloride under pressure and distilling off the ester formed under reduced pressure.

9. The method of producing an alkyl ester of abietic acid, which includes heating abietic acid, an alkali and an alkyl halide under pressure and then distilling off the ester formed under reduced pressure.

10. The method of producing an alkyl ester of abietic acid, which includes heating sodium abietate, an alkyl chloride and alcohol under pressure and distilling off the ester formed under reduced pressure.

11. The method of producing an alkyl ester of abietic acid, which includes heating abietic acid, an alkali, and an alkyl halide under pressure in the presence of a solvent for both the alkyl halide and the ester to be produced, separating the alkali halide formed from the solution of the ester formed and distilling off the ester under reduced pressure.

12. The method of producing the ethyl ester of abietic acid, which includes the step of subjecting an alkali metal salt of abietic acid to treatment with an ethyl halide and distilling off the ester formed under reduced pressure.

13. The method of producing the ethyl ester of abietic acid, which includes the step of subjecting an inorganic salt of abietic acid to treatment with ethyl chloride and distilling off the ester formed under reduced pressure.

14. The method of producing the ethyl ester of abietic acid, which includes heating a solution of abietic acid, an alkali and an ethyl halide and distilling off the ester formed under reduced pressure.

15. The method of producing the ethyl ester of abietic acid, which includes subjecting abietic acid to treatment with an ethyl halide in the presence of alcohol and alkali and distilling off the ester formed under reduced pressure.

16. The method of producing the ethyl ester of abietic acid, which includes subjecting abietic acid to treatment with an ethyl halide and alkali while heating under pressure and distilling off the ester formed under reduced pressure.

17. The method of producing the ethyl ester of a resin acid, which includes heating a solution of a resin acid, an alkali and an ethyl halide under pressure and then distilling off the ethyl ester under reduced pressure.

18. The method of producing the ethyl ester of a resin acid, which includes heating a solution of a resin acid, an alkali and ethyl chloride under pressure and then distilling off the ethyl ester under reduced pressure.

19. The method of producing the ethyl ester of rosin, which includes heating a solution of rosin, an alkali and an ethyl halide and distilling off the ester formed under reduced pressure.

20. The method of producing the ethyl ester of wood rosin, which includes heating a solution of wood rosin, an alkali and an ethyl halide and distilling off the ester formed under reduced pressure.

21. The method of producing an alkyl ester of wood rosin, which includes the step of treating wood rosin with an alkyl halide in the presence of an alkali and distilling off the ester formed under reduced pressure.

22. The method of producing an alkyl ester of wood rosin, which includes subjecting wood rosin to treatment with an alkyl halide in the presence of alcohol and an alkali and distilling off the ester formed under reduced pressure.

23. The method of producing an alkyl ester of wood rosin, which includes heating an inorganic salt of wood rosin with an alkyl chloride under pressure and distilling off the ester formed under reduced pressure.

24. The method of producing the ethyl ester of a resin acid, which includes heating to a temperature of about 150° C.–160° C. a solution of a resin acid, an alkali and ethyl chloride under pressure and then distilling off the ethyl ester under reduced pressure.

25. The method of producing the ethyl ester of abietic acid which includes heating to a temperature of about 150° C.–160° C. a solution of rosin, an alkali and ethyl chloride under pressure and then distilling off the ethyl ester under reduced pressure.

In testimony of which invention, I have hereunto set my hand, at Kenvil, New Jersey, on this 13th day of October, 1927.

ALAN C. JOHNSTON.